(12) United States Patent
Ziegler

(10) Patent No.: US 6,363,630 B1
(45) Date of Patent: Apr. 2, 2002

(54) FOUR WHEEL DRIVE SNOW BLOWER

(75) Inventor: Craig Ziegler, Waterloo (CA)

(73) Assignee: MTD Products INC, Cleveland, OH (US)

( * ) Notice: Subject to any disclaimer, the term of this patent is extended or adjusted under 35 U.S.C. 154(b) by 0 days.

(21) Appl. No.: 09/573,598

(22) Filed: May 18, 2000

Related U.S. Application Data

(60) Provisional application No. 60/135,544, filed on May 24, 1999.

(51) Int. Cl.⁷ .............................. B62D 51/04; E01H 5/00
(52) U.S. Cl. ........................................ 37/257; 180/19.3
(58) Field of Search .................... 280/91, 99; 180/65.1, 180/65.5, 19.3, 65.6, 291, 292, 6.48, 6.5, 2.2; 37/257, 243, 244, 247, 249, 251, 252

(56) References Cited

U.S. PATENT DOCUMENTS

| | | | |
|---|---|---|---|
| 3,791,469 A | 2/1974 | Prosser et al. ............... 180/6.2 |
| 4,023,286 A | 5/1977 | Wickware ...................... 37/14 |
| 4,186,967 A | 2/1980 | Kuhmonen .................... 299/25 |
| 4,289,214 A | 9/1981 | Spence ........................ 180/234 |
| 4,308,676 A | 1/1982 | Doane ........................... 37/43 |
| 4,493,385 A | 1/1985 | Shiber ........................ 180/6.2 |
| 4,574,502 A | 3/1986 | Blau ........................... 37/266 |
| 4,590,694 A | 5/1986 | Block ........................... 37/233 |
| 4,620,599 A | * 11/1986 | Zinck .......................... 172/42 |
| 4,625,990 A | 12/1986 | Orth et al. ............... 280/415 R |
| 4,658,662 A | 4/1987 | Rundle ......................... 74/331 |
| 4,869,124 A | 9/1989 | Czeban et al. ................ 74/526 |
| 5,018,592 A | 5/1991 | Buchdrucker .............. 180/19.3 |
| 5,048,206 A | 9/1991 | Jones .......................... 37/265 |
| 5,052,135 A | 10/1991 | Fountaine .................... 37/243 |
| 5,174,595 A | 12/1992 | Snipes ......................... 280/91 |
| 5,513,453 A | 5/1996 | Norton ........................ 37/244 |
| 5,520,253 A | * 5/1996 | Kesting ...................... 172/125 |
| 5,690,178 A | * 11/1997 | Zehrung, Jr. et al. ......... 172/19 |
| 5,743,347 A | 4/1998 | Gingerich .................... 180/65 |
| 6,151,811 A | * 11/2000 | Barreto ........................ 37/352 |

* cited by examiner

*Primary Examiner*—Robert E. Pezzuto
(74) *Attorney, Agent, or Firm*—Emerson & Jkeriotis; Roger D. Emerson; Timothy D. Bennett

(57) ABSTRACT

A snow thrower is provided a pair of wheels on each side. The snow thrower includes two laterally spaced wheel drive assemblies for independently supplying power from the engine to each pair of wheels. Each wheel drive assembly includes a drive sprocket, which receives input from the engine, and front and rear driveable sprockets, which are operably associated with front and rear wheel axles to drive one pair of wheels. Each wheel assembly may be operated independently to provide power steering control.

8 Claims, 5 Drawing Sheets

FOUR WHEEL DRIVE SNOW BLOWER

This application claims priority to U.S. Provisional Patent application Serial No. 60/135,544, entitled FOUR WHEEL DRIVE SNOW BLOWER, filed May 24, 1999.

I. BACKGROUND OF THE INVENTION

A. Field of Invention

This invention pertains to the art of apparatuses and methods of snow throwers and more specifically to methods and apparatuses for snow throwers having more than two driven wheels.

B. Description of the Related Art

Snow throwers are commonly known in the art and include a rotatable wheel or paddle for accumulating snow and throwing the snow away from the area. Such snow throwing devices commonly are of the paddle-type or auger-type.

In U.S. Pat. No. 5,018,592, a steering control for snow blowers is disclosed. As is usual, the walk-behind snow blower described therein includes only two wheels. Each of the wheels is a "drive wheel." In this snow blower, each of the two wheels is associated with an independent clutch which can selectively disengage the power to its associated wheel and thereby allow power steering of the snow blower.

Other machines, such as convertible lawn mowers, move along the ground on four wheels. One or both of the rear wheels may be drive wheels to provide greater ease in negotiating the apparatus when in use.

There exists a need in the art to provide the stability of a four-wheeled snow thrower wherein each of the wheels is powered to allow easier negotiation of the apparatus.

The present invention overcomes the difficulties inherent in the art a way that is simple, inexpensive and efficient, while providing better and more advantageous results.

II. SUMMARY OF THE INVENTION

In accordance with the present invention, there is provided a drive system that allows each of four wheels of a snow thrower to be powered.

According to one aspect of the invention, a snow thrower apparatus includes an engine, a first pair of wheels on a first side, and a second pair of wheels on a second side. The apparatus comprises laterally spaced first and second drive wheel means operationally associated with the first and second pairs of wheel and means to transfer power from the engine to the first and second wheel drive means.

According to another aspect of the invention, the snow thrower apparatus includes means for driving the first pair of wheels independently of driving the second pair of wheels.

According to another aspect of the invention, the first pair of wheels operate as a unit when they are driven.

According to another aspect of the invention, the first wheel drive means comprises a drive sprocket operationally associated with the power transfer means, a front driven sprocket, a rear driven sprocket, and a continuous drive member contacting the drive sprocket and the driven sprockets.

According to another aspect of the invention, the power transfer means comprises a single selectively engageable drive clutch.

According to another aspect of the invention, the power transfer means comprises more than one selectively engageable drive clutch.

According to another aspect of the invention, the snow thrower apparatus includes a dual clutch assembly wherein a first wheel clutch is operably associated with a first wheel drive assembly and a second wheel clutch is operably associated with a second wheel drive assembly.

According to another aspect of the invention, upon engagement of the first wheel clutch, a first pair of wheels on a first side of the snow thrower apparatus are driven.

One advantage of the invention is that the four wheels on the snow thrower provide stability.

Another advantage of the invention is that all four wheels of the snow thrower may be driven.

Another advantage of the invention is that the pair of wheels on one side of the snow thrower may be driven independently of the pair of wheels on the other side of the snow thrower and thereby power steering control is attained.

Still other benefits and advantages of the invention will become apparent to those skilled in the art to which it pertains upon a reading and understanding of the following detailed specification.

III. BRIEF DESCRIPTION OF THE DRAWINGS

IV. DESCRIPTION OF THE PREFERRED EMBODIMENT

Figure 1:
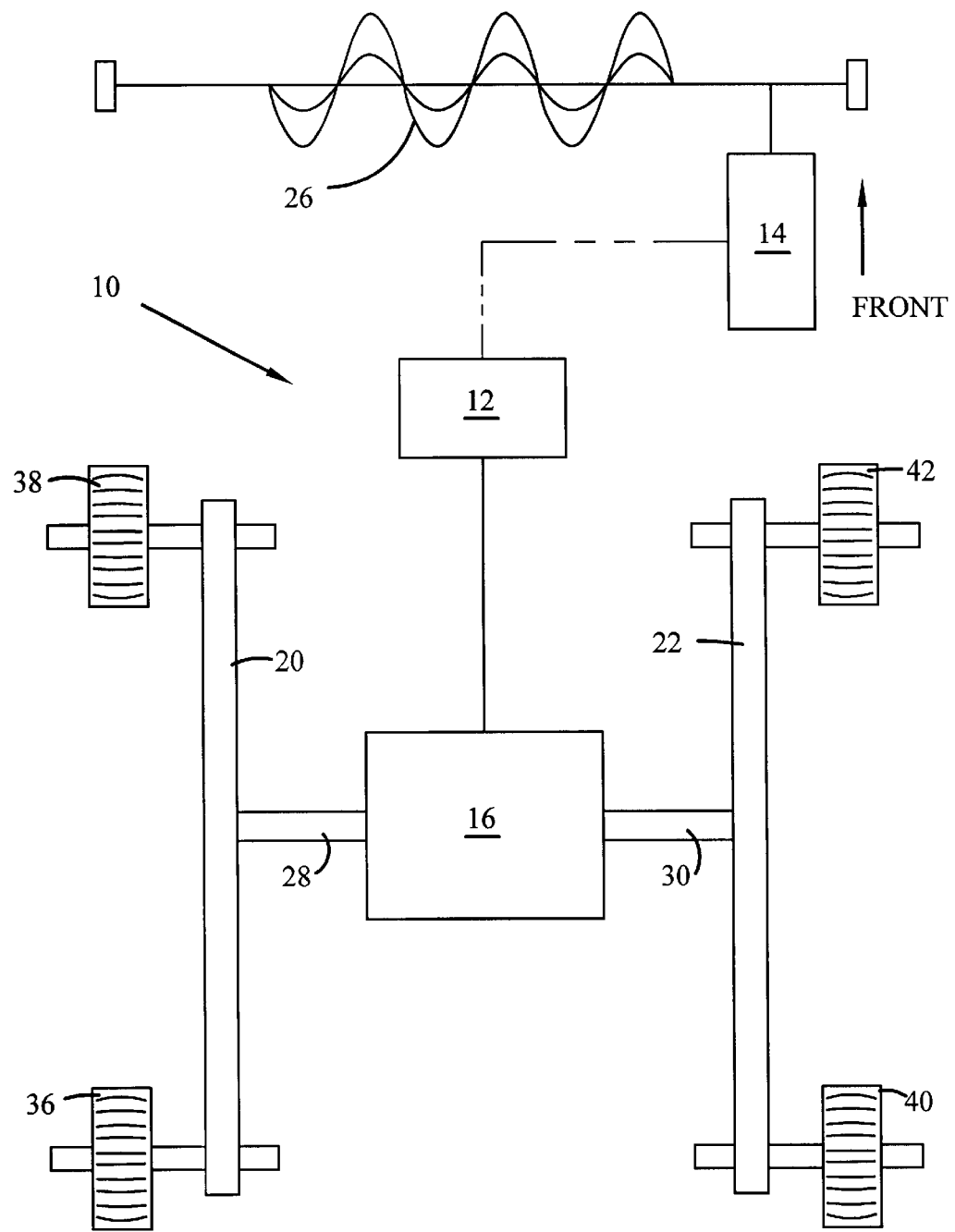
FIG. 1 is a diagram of a preferred embodiment of the invention utilizing a pair of wheel drive assemblies.

With reference to FIG. 1, a preferred embodiment of the present invention is illustrated. A drive system 10 includes an engine 12, a snow thrower clutch 14, a drive clutch 16 and first and second wheel drive assemblies 20, 22.

The engine 12 is preferably a small internal combustion engine of about 5 to 10 horsepower. The engine 12 is drivingly connected to the snow thrower's operating systems through the snow thrower clutch 14. The engagement/disengagement of this clutch 14 may be controlled through means known in the art, such as for example, manipulation of a lever located on a handle bar. The snow thrower auger 26 itself is of conventional design and construction.

Drive clutch 16 is operationally associated with first and second wheel drive assemblies 20, 22 to transfer power from engine 12. The first and second wheel drive assemblies are supported by first and second half shafts 28, 30. An important aspect of the present invention involves the design and operation of wheel drive assemblies 20, 22. The first wheel drive assembly 20 drives the pair of left-side wheels, rear wheel 36 and front wheel 38. Likewise, second wheel drive assembly 22 drives the pair of right-side wheels, rear wheel 40, and front wheel 42.

Figure 2:
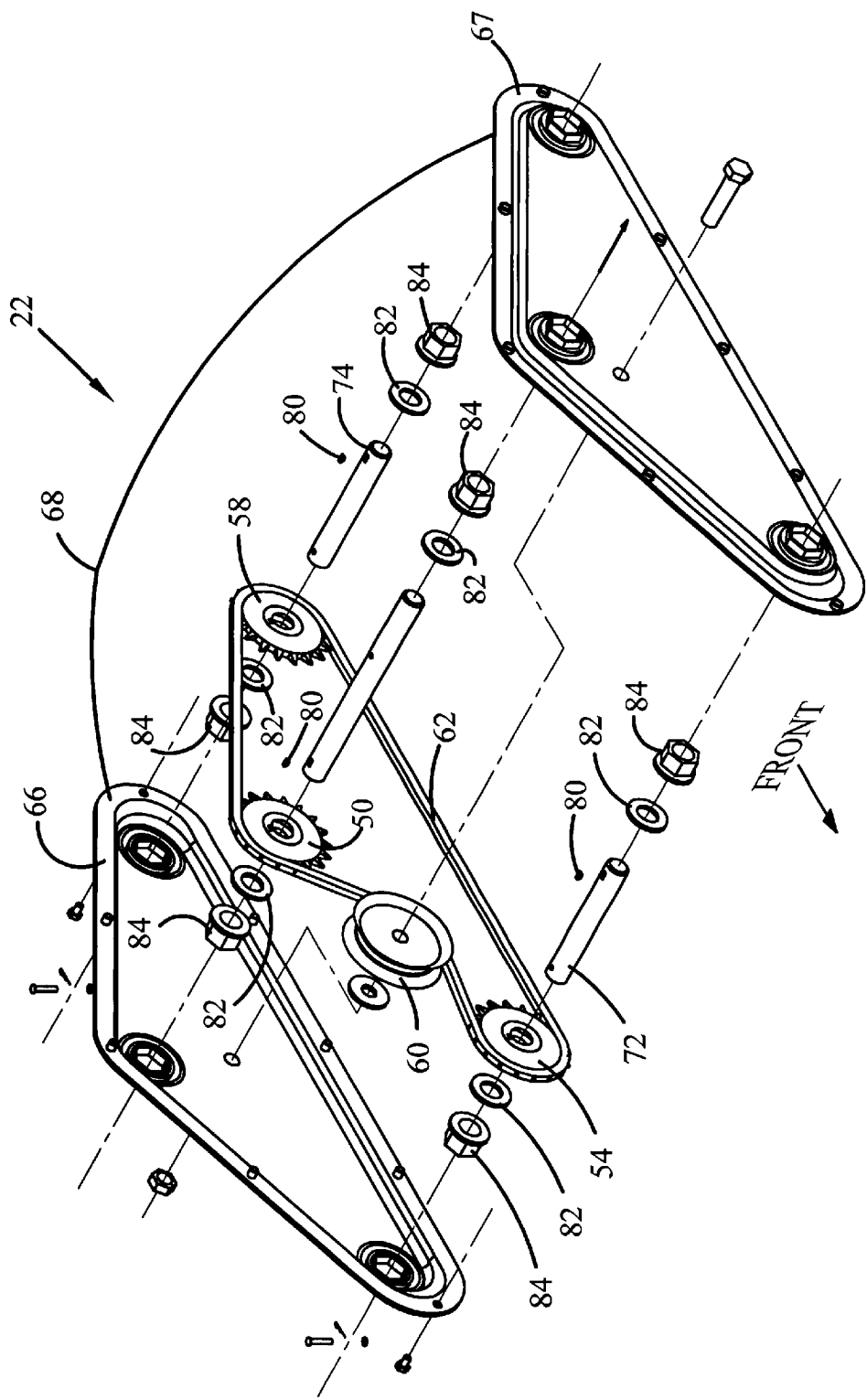
FIG. 2 is an exploded view of a right side chain case.

The preferred arrangement of the second wheel drive assembly 22 is shown in FIG. 2. The drive wheel assembly 22 includes a drive sprocket 50, front driveable sprocket 54, rear driveable sprocket 58, idler pulley 60 and drive member 62, which may comprise a belt, a chain, or the like. In a preferred embodiment, the drive sprocket 50 and driveable sprockets 54, 58 are enclosed within two halves 66, 67 of right chain case 68. Drive sprocket 50 is operationally attached to half shaft 30. Power from the drive clutch 16 is transferred to drive sprocket 50 through the rotation of half shaft 30. As drive sprocket 50 rotates, drive member 62 causes the rotation of front driveable sprocket 54 and rear driveable sprocket 58. In the preferred embodiment, front axle 72 is operationally associated with front driveable sprocket 54 in order to rotate therewith and drive the right front wheel 42. Likewise, rear axle 74 is operationally associated with rear driveable sprocket 58 in order to rotate therewith and drive right rear wheel 40. The axles 72, 74 may be held in place by sprocket keys 80, which are sandwiched by washers 82 and bushings 84. The drive sprocket 50 and driveable sprockets 54, 58 are preferably aligned in a common plane generally normal to the half shaft 30. The idler pulley 60 is of conventional design and functions to keep drive member 62 positively engaged against drive sprocket 50 and front and rear driveable sprockets 54, 58.

For simplicity, only the right-side components have been described. However, the preferred embodiment includes corresponding components arranged on the left side of the snow thrower.

It is within the scope of the present invention to provide a single selectively engageable drive clutch 16 that concurrently provides power to both drive wheel assemblies 20, 22. The drive clutch 16 may be selectively engaged/disengaged to drive the wheels 36, 38, 40, 42, or allow the free rotation thereof. It is further within the scope of the present invention that drive sprockets 50 are supported on a common shaft, rather than two half shafts 28, 30 when a single drive clutch 16 is utilized to drive the wheels 36, 38, 40, 42.

Figure 3:
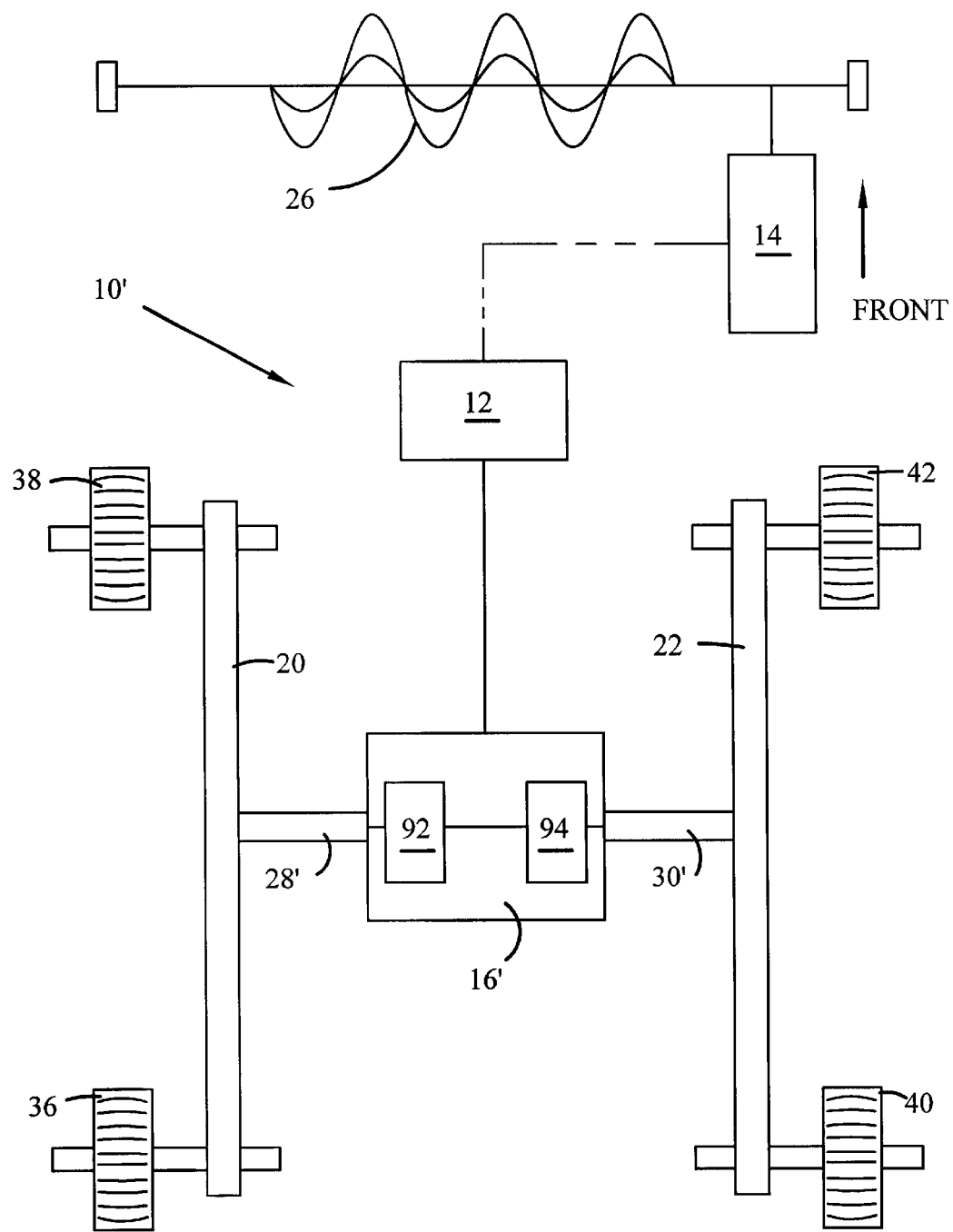
FIG. 3 is a diagram of an alternate embodiment of the invention incorporating means for power steering the snow thrower; and, FIG. 4 is a lateral cross-sectional view of a drive mechanism of one embodiment of the present invention incorporating a dual-clutch system.

However, in another preferred embodiment, the drive wheel assemblies 20, 22 are each associated with one of a pair of independent clutches. With reference to FIG. 3, an alternate embodiment of the invention is illustrated. This embodiment includes means for providing steering control for snow blowers similar to the mechanisms disclosed in U.S. Pat. No. 5,018,592 to Buchdrucker, the entirety of which is incorporated herein by reference. In FIG. 3, as in the earlier described embodiment, the drive system 10' includes engine 12 and snow thrower clutch 14. In this embodiment, however, drive clutch 16' comprises a dual clutch system including first and second wheel clutches 92, 94. First wheel clutch 92 is operably associated with first half shaft 28' to supply power to first wheel drive assembly 20. Second wheel clutch 94 is operably associated with second half shaft 30' to supply power to second wheel drive assembly 22. The design and operation of wheel drive assemblies 20, 22 are similar to the previously described embodiment.

In the embodiment illustrated in FIG. 3, the selective engagement of both wheel clutches 92, 94 allows power to be supplied to both the first and second wheel drive assemblies 20, 22 causing the snow thrower to proceed in a straight forward direction. However, engagement of only the first wheel clutch 92 provides power only to first wheel drive assembly 20, allowing only the left side wheels 36, 38 to be driven while right side wheels 40, 42 may freely rotate. This action causes the snow thrower to turn right on forward operation. Alternately, power may only be supplied to second wheel drive assembly 22 by engagement of only the second wheel clutch 94, allowing only the right side wheels 40, 42 to be driven. This action causes the snow thrower to turn right on forward operation. Therefore, a power steering mechanism is incorporated into the present invention. It should be noted that in this embodiment, the right pair of wheels 40, 42 are powered or not powered as a unit. Likewise, the left pair of wheels 36, 38 are either driven or not driven as a unit.

Figure 4:
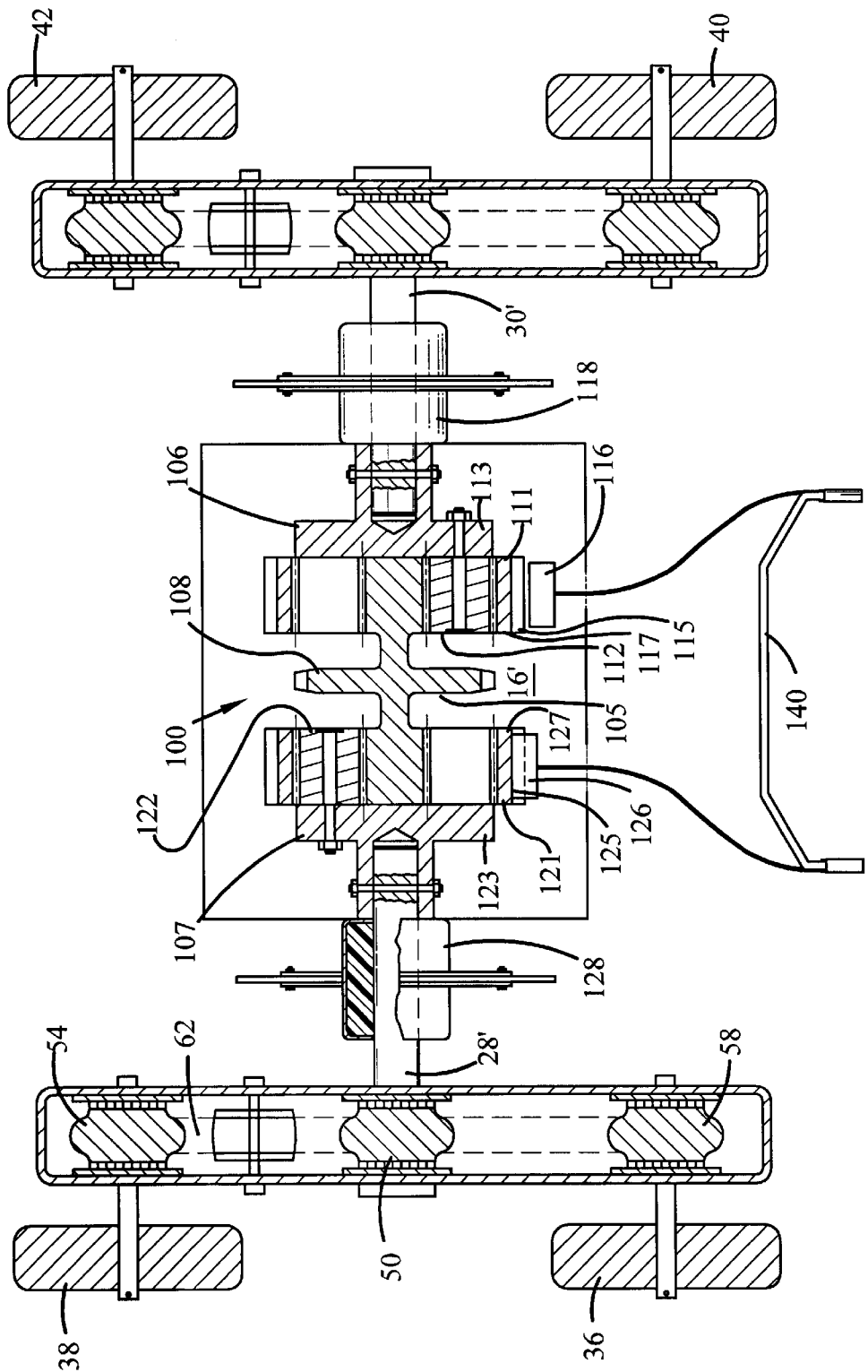

In FIG. 4, an exemplary drive clutch 16' is shown that is capable of selectively providing power to left-side wheels 36, 38 or to right-side wheels 40, 42. This embodiment of the drive clutch 16' is similar to that described in the aforementioned U.S. Pat. No. 5,018,592. A clutching planetary reduction axle 100 has a central free floating chain driven twin sun gear assembly 105 supported by two planetary gear half shafts 106, 107. The twin sun gear assembly 105 transfers the power from the incoming drive sprocket 108 to the two opposing sun gears 110, 120. Two ring gears 111, 121 are located concentrically about the two sun gears 110, 120 with planet gears 112, 122 located therebetween. The planet gears are rotatively mounted to planet carriers 113, 123. The planet carriers 113, 123 are in turn bolted to the two drive half shafts 28', 30'. The two drive half shafts 28', 30' are in turn rotatively mounted by bearings 118, 128 to the frame (not shown) of the snow thrower.

Each of the ring gears 111, 121 has a toothed outer diameter 115, 125 with a pawl 116, 126 that is selectively engageable with one of the teeth 117, 127. As shown in FIG. 4, for example, when pawl 126 is engaged with a tooth 127, the action of the gear system causes left drive shaft 28' to be rotated. Drive sprocket 50 is thereby rotated and power is transferred through drive member 62 to front driveable sprocket 54 and rear driveable sprocket 58 in order to drive left-side wheels 36, 38. A disengaged pawl 116 allows free rotation of right drive shaft 30' and, therefore in this example, right-side wheels 40, 42 are not driven.

The single drive clutch 16 (FIG. 1) or the dual clutch system 16' (FIG. 3) may be selectively engaged/disengaged through various means known in the art. In one preferred embodiment, hand controls are located on the handlebar 140. The hand controls may be buttons, levers, or triggers and the like. If a single drive clutch 16 is utilized, forward motion of the snow thrower is affected by engagement/disengagement of the drive mechanism. Manipulation of the snow thrower in a direction other than forward would involve temporarily disengaging the drive mechanism and pushing against the handlebar to steer the snow thrower.

Use of a dual clutch system 16' allows for power steering of the snow thrower. A pair of wheels on one side of the snow thrower could still be driven while drive mechanism for the pair of wheels on the other side of the snow thrower is temporarily disengaged. Any of the steering mechanisms set forth in U.S. Pat. No. 5,018,592 may be incorporated into the design of a snow thrower utilizing the present invention.

Although one specific dual clutch mechanism has been set forth as the preferred mechanism, other clutch mechanisms known in the art can be utilized to selectively engage/disengage the means to transfer power from the engine 12 to wheels 36, 38, 40, 42.

Figure 5:
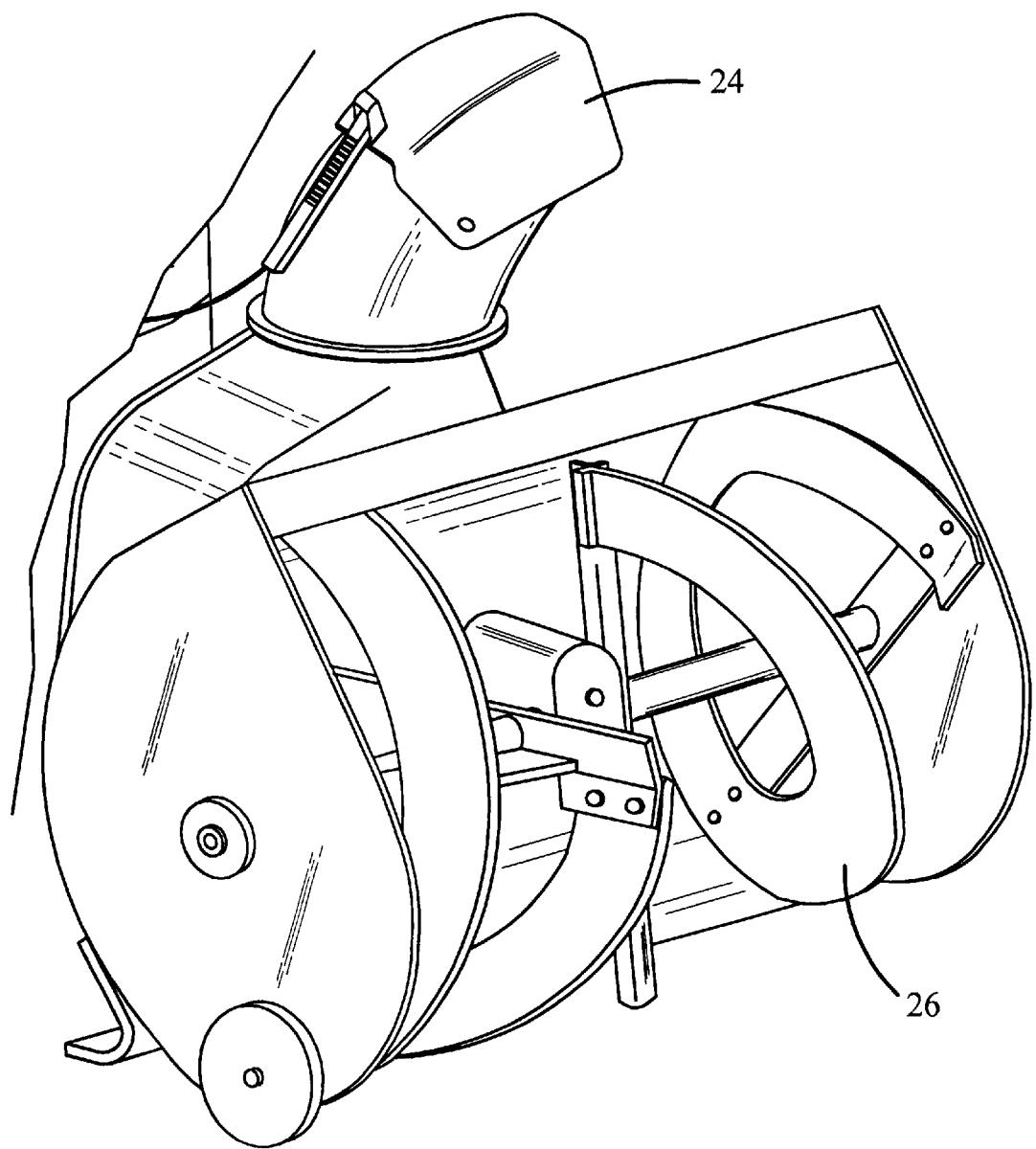
FIG. 5 is a perspective view of the snow thrower of the present invention.

With reference now to FIG. 5, the auger 26 and discharge chute 24 are shown. The auger 26 and discharge 24, and the operation thereof, are commonly known in the art, and, for the sake of brevity, will not be described herein. It is to be understood that the displacing means, shown as the auger 26 in FIG. 6, can be any means for displacing snow, and is not limited to an auger 26. The auger 26 and discharge chute 24 are meant to be illustrative examples only, and are not intended to limit the invention in any manner.

While the invention has been described in connection with specific embodiments and applications, no intention to restrict the invention to the examples shown is contemplated. It will be apparent to those skilled in the art that the above methods may incorporate changes and modifications without departing from the general scope of this invention. It is intended to include all such modifications and alterations in so far as they come within the scope of the appended claims or the equivalents thereof.

I claim:

1. A snow thrower apparatus having an engine, the apparatus comprising:

a selectively engageable drive clutch;

a first wheel drive assembly including a rotatable drive sprocket, a front driveable sprocket, a rear driveable sprocket, and a drive member for rotating the front and rear driveable sprockets in response to rotation of the drive sprocket;

a rotatable first half shaft being operationally associated with the drive clutch, the first half shaft supporting the first wheel drive assembly, the drive sprocket of the first wheel drive assembly being rotatable with the first half shaft;

a first front wheel axle supporting a first front wheel, the first front wheel axle being rotatable with the first front driveable sprocket;

a first rear wheel axle supporting a first rear wheel, the first rear wheel axle being rotatable with the first rear driveable sprocket;

a second wheel drive assembly laterally spaced from the first wheel drive assembly, the second wheel drive assembly including a rotatable drive sprocket, a front driveable sprocket, a rear driveable sprocket, and a drive member for rotating the front and rear driveable sprockets in response to rotation of the drive sprocket of the second wheel drive assembly;

a rotatable second half shaft being operationally associated with the drive clutch, the second half shaft supporting the second wheel drive assembly, the drive sprocket of the second wheel drive assembly being rotatable with the second half shaft;

a second front wheel axle supporting a second front wheel, the second front wheel axle being rotatable with the second front driveable sprocket; and, a second rear wheel axle supporting a second rear wheel, the second rear wheel axle being rotatable with the second rear driveable sprocket.

2. The snow thrower apparatus of claim 1 wherein the drive clutch includes a first selectively engageable wheel clutch being operably associated with the first half shaft and a second selectively engageable wheel clutch being operably associated with the second half shaft.

3. The snow thrower apparatus of claim 1 further comprising:

means for independently rotating the first half shaft; and, means for independently rotating the second half shaft.

4. A walk-behind snow thrower apparatus having an engine, a first pair of wheels on a first side, and a second pair of wheels on a second side, the apparatus comprising:

laterally spaced first and second drive wheel means, the first drive wheel means being operationally associated with the first pair of wheels and the second drive wheel means being operationally associated with the second pair of wheels;

means to transfer power from the engine to first and second wheel drive means; the power transfer means comprises a single selectively engageable drive clutch and a handlebar operatively attached to said snow thrower apparatus for use in turning the walk-behind snow thrower.

5. The snow thrower apparatus of claim 4 wherein the first wheel drive means comprises:

a drive sprocket operationally associated with the power transfer means;

a front driven sprocket;

a rear driven sprocket; and, a continuous drive member contacting the drive sprocket and the driven sprockets.

6. The snow thrower apparatus of claim 4 wherein the power transfer means comprises:

means for independently transferring power to the first wheel drive means; and, means for independently transferring power to the second wheel drive means.

7. The apparatus of claim 6 wherein each of the four wheels is independently driven.

8. The snow thrower apparatus of claim 6 wherein the power transfer means comprises:

first and second selectively engageable wheel clutches.

* * * * *